(12) United States Patent
Bull et al.

(10) Patent No.: US 10,467,343 B2
(45) Date of Patent: Nov. 5, 2019

(54) DETECTING PROBLEMATIC LANGUAGE IN INCLUSION AND EXCLUSION CRITERIA

(71) Applicant: INTERNATIONAL BUSINESS MACHINES CORPORATION, Armonk, NY (US)

(72) Inventors: Brendan C. Bull, Durham, NC (US); Scott R. Carrier, Apex, NC (US); Aysu Ezen Can, Cary, NC (US); Dwi Sianto Mansjur, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/667,815

(22) Filed: Aug. 3, 2017

(65) Prior Publication Data
US 2019/0042562 A1    Feb. 7, 2019

(51) Int. Cl.
*G06F 17/27* (2006.01)

(52) U.S. Cl.
CPC ........ *G06F 17/2785* (2013.01); *G06F 17/271* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/2795
USPC .................................................. 704/1, 9, 10
See application file for complete search history.

(56) References Cited

U.S. PATENT DOCUMENTS

| | | | |
|---|---|---|---|
| 5,724,571 A * | 3/1998 | Woods | ..................... G06F 16/30 |
| 6,018,733 A * | 1/2000 | Kirsch | ................ G06F 17/3061 |
| 6,805,668 B1 * | 10/2004 | Cadwell | ................... A61B 5/16 128/925 |
| 7,856,380 B1 * | 12/2010 | Latin-Stoermer | ........................... G06F 17/30256 705/27.1 |
| 8,468,244 B2 | 6/2013 | Redlich et al. | |
| 8,656,330 B1 * | 2/2014 | Kuehlmann | ............ G06F 17/10 716/111 |
| 9,251,203 B2 | 2/2016 | Handler et al. | |

(Continued)

OTHER PUBLICATIONS

Tammemagi et al., Selection Criteria for Lung-Cancer screening, The New England Journal of Medicine, pp. 728-736 (Year: 2013).*

(Continued)

*Primary Examiner* — Lamont M Spooner
(74) *Attorney, Agent, or Firm* — Kristofer L. Haggerty

(57) ABSTRACT

Embodiments of the present invention disclose a method, a computer program product, and a computer system for ranking inclusion and exclusion criteria based on problematic language. A computer receives criteria and identifies semantic entailment between two or more criteria. The computer further identifies inclusionary criteria that appear as exclusionary criteria and exclusionary criteria that is difficult to interpret. The computer additionally identifies criteria having hypothetical, time specific, or complex language. Based on the computer identifying inclusionary criteria that appears as exclusionary criteria, exclusionary criteria that is difficult to interpret, or criteria having hypothetical, time specific, or complex language, the computer ranks the subject criteria based on the identified problematic language and presents the ranked criteria.

18 Claims, 6 Drawing Sheets

(56) References Cited

U.S. PATENT DOCUMENTS

| | | | |
|---|---|---|---|
| 9,507,867 B2 | 11/2016 | Johns et al. | |
| 9,959,315 B1* | 5/2018 | Gupta | G06F 17/30528 |
| 2005/0154708 A1* | 7/2005 | Sun | G06F 16/27 |
| 2005/0193333 A1* | 9/2005 | Ebert | G06Q 30/02 |
| | | | 715/243 |
| 2006/0010430 A1* | 1/2006 | Cousot | G06F 21/16 |
| | | | 717/127 |
| 2007/0166689 A1* | 7/2007 | Huang | G09B 7/00 |
| | | | 434/365 |
| 2008/0162468 A1* | 7/2008 | Frohlich | G06F 17/30749 |
| 2008/0301127 A1* | 12/2008 | Gilmer | G06F 17/30864 |
| 2010/0017390 A1* | 1/2010 | Yamasaki | G06F 16/3325 |
| | | | 707/E17.008 |
| 2011/0105089 A1* | 5/2011 | Ellis | H04M 3/53383 |
| | | | 455/413 |
| 2013/0054583 A1* | 2/2013 | Macklem | G06F 17/30867 |
| | | | 707/723 |
| 2013/0110566 A1* | 5/2013 | Sousa Sobral | G06Q 30/0609 |
| | | | 705/7.12 |
| 2013/0268526 A1 | 10/2013 | Johns et al. | |
| 2014/0163962 A1* | 6/2014 | Castelli | G06F 17/2715 |
| | | | 704/9 |
| 2014/0235276 A1* | 8/2014 | Lefkowitz | H04W 4/02 |
| | | | 455/456.3 |
| 2014/0250134 A1* | 9/2014 | Jones | G06F 17/3053 |
| | | | 707/748 |
| 2014/0255896 A1* | 9/2014 | Saha | G09B 7/00 |
| | | | 434/350 |
| 2015/0034536 A1* | 2/2015 | Rada | A61M 1/1601 |
| | | | 210/85 |
| 2015/0286801 A1 | 10/2015 | Syeda-Mahmood | |
| 2015/0371137 A1* | 12/2015 | Giffels | G06N 5/02 |
| | | | 706/46 |
| 2016/0098394 A1 | 4/2016 | Bruno et al. | |
| 2016/0117314 A1* | 4/2016 | Kantor | G06F 17/2785 |
| | | | 704/9 |
| 2016/0148222 A1* | 5/2016 | Davar | G06Q 30/0201 |
| | | | 705/7.32 |
| 2017/0103441 A1* | 4/2017 | Kolb | G06Q 30/0627 |
| 2017/0213303 A1* | 7/2017 | Papadopoulos | G06Q 50/163 |
| 2017/0252434 A1* | 9/2017 | Joseph | A61K 45/06 |
| 2018/0005191 A1* | 1/2018 | Metrewar | G06Q 10/1053 |
| 2018/0122256 A1* | 5/2018 | Smith | G09B 7/00 |

OTHER PUBLICATIONS

Bowman et al., "Recursive Neural Networks Can Learn Logical Semantics," arXiv: 1406.1827v4 [cs.CL], May 14, 2015, Stanford Linguistics, Stanford NLP Group, Stanford Computer Science, pp. 1-10.

Disclosed Anonymously, "Natural language semantics in support of knowledge base searching and computer aided troubleshooting," An Ip.com Prior Art Database Technical Disclosure, Ip.com Number: IPCOM000246121DIP.com, Electronic Publication Date: May 10, 2016, pp. 1-7.

Disclosed Anonymously, "System and Method to track recipient inclusion/Exclusion and their participation in a email conversation," An Ip.com Prior Art Database Technical Disclosure, Ip.com Number: IPCOM000199912DIP.com, Electronic Publication Date: Sep. 21, 2010, pp. 1-6.

Mell et al., "The NIST Definition of Cloud Computing," National Institute of Standards and Technology, U.S. Department of Commerce, Special Publication 800-145, Sep. 2011, pp. 1-7.

\* cited by examiner

DETECTING PROBLEMATIC LANGUAGE IN INCLUSION AND EXCLUSION CRITERIA

BACKGROUND

The present invention relates generally to natural language processing, and more specifically to identifying problematic language in inclusion and exclusion criteria.

Many business domains apply criteria to candidates, such as customers, patients, applicants, etc. to check their eligibility for a given service. For example, the criteria may define characteristics required for services such as inclusion in a medical trial, eligibility for insurance, enrolment in an activity, etc. These criteria may be written in terms of inclusion, i.e. the candidate must exhibit these characteristics, and exclusion, i.e. the candidate must not exhibit these characteristics. Often times, however, this criteria is written in a confusing or negating manner which can be difficult to decipher. As computing systems begin to process more natural language criteria sets, it is helpful to clarify criteria with problematic language.

SUMMARY

Embodiments of the present invention disclose a method, a computer program product, and a computer system for ranking inclusion and exclusion criteria based on problematic language.

In one embodiment, the present invention provides a mechanism to rank the overall quality of a global criteria set by measuring semantic entailment between inclusion and exclusion criteria.

In another embodiment, the present invention provides a mechanism to rank individual criteria based on problematic language. In this embodiment, the problematic language includes inclusion criteria appearing as exclusion criteria, exclusion criteria being difficult to interpret, and criteria including hypothetical, time sensitive language, or complex language.

DETAILED DESCRIPTION

Figure 1:
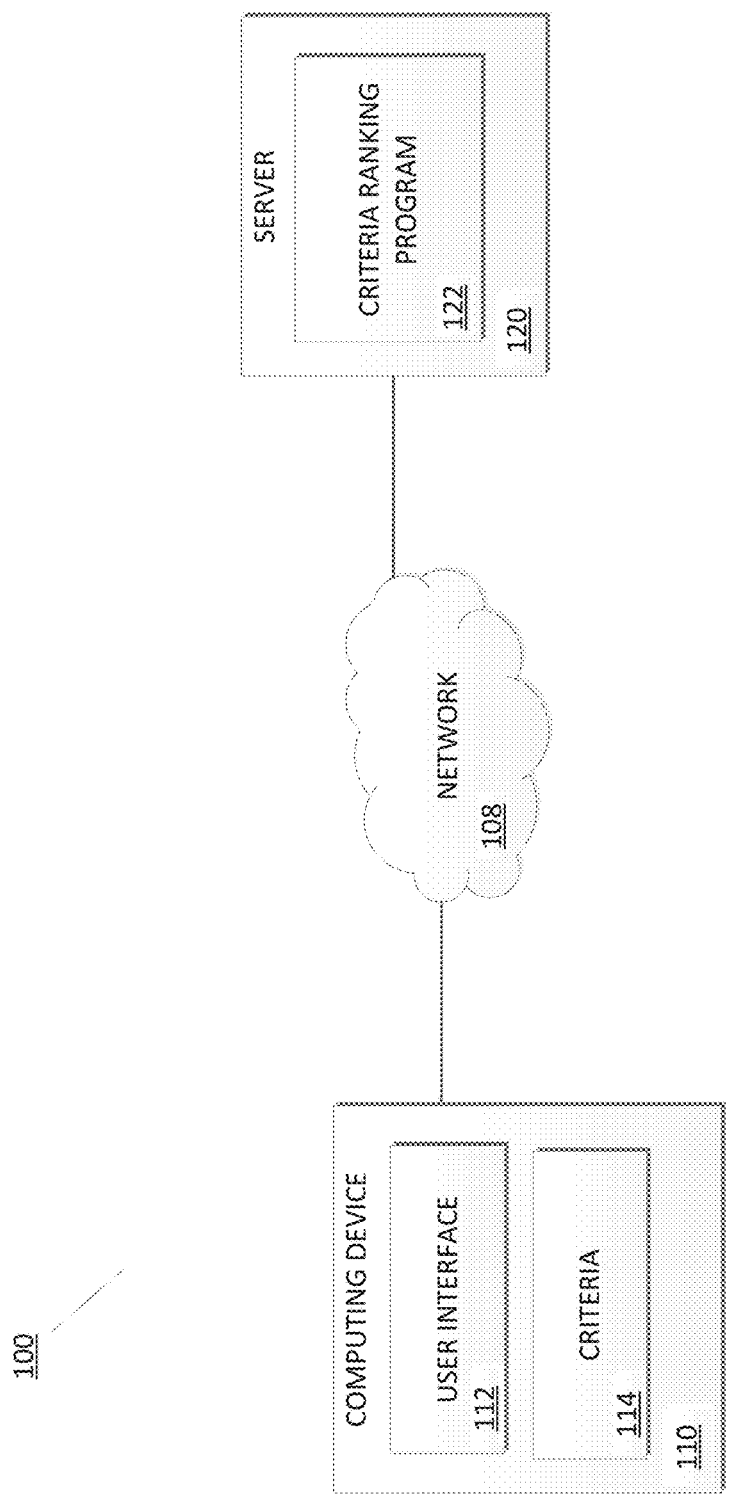
FIG. 1 is a schematic diagram of a criteria ranking system 100, in accordance with an embodiment of the present invention.

A criteria ranking system 100 in accordance with an embodiment of the invention is illustrated by FIG. 1.

In the example embodiment, network 108 is a communication channel capable of transferring data between connected devices. In the example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In yet further embodiments, network 108 may be a telecommunications network used to facilitate telephone calls between two or more parties comprising a landline network, a wireless network, a closed network, a satellite network, or any combination thereof. In general, network 108 can be any combination of connections and protocols that will support communications between computing device 110 and server 120.

In the example embodiment, computing device 110 includes user interface 112 and criteria 114. Computing device 110 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While computing device 110 is shown as a single device, in other embodiments, computing device 110 may be comprised of a cluster or plurality of computing devices, working together or working separately. Computing device 110 is described in more detail with reference to FIG. 4.

User interface 112 is a software application which allows a user of computing device 110 to interact with computing device 110 as well as other connected devices via network 108. In addition, user interface 112 may be connectively coupled to hardware components, such as those depicted by FIG. 4, for receiving user input, including mice, keyboards, touchscreens, microphones, cameras, and the like. In the example embodiment, user interface 112 is implemented via a web browsing application containing a graphical user interface (GUI) and display that is capable of transferring data files, folders, audio, video, hyperlinks, compressed data, and other forms of data transfer individually or in bulk. In other embodiments, user interface 112 may be implemented via other integrated or standalone software applications and hardware capable of receiving user interaction and communicating with other electronic devices.

Criteria 114 are sets of standards that are used to determine the eligibility of candidates for a given service or trial. Such candidates may include customers, patients, applicants, etc., and such services may be inclusion in a medical trial, application for insurance, application for a mortgage, etc. In the example embodiment, criteria 114 may be written in terms of inclusion, i.e. qualities the candidates must have, and/or exclusion i.e. qualities the candidates must not have. In the example embodiment, a particular service may have any number of associated inclusion or exclusion criteria.

In the example embodiment, server 120 includes criteria ranking program 122. Server 120 may be a laptop computer, a notebook, a tablet computer, a netbook computer, a personal computer (PC), a desktop computer, a personal digital assistant (PDA), a rotary phone, a touchtone phone, a smart phone, a mobile phone, a virtual device, a thin client, or any other electronic device or computing system capable of receiving and sending data to and from other computing devices. While server 120 is shown as a single device, in other embodiments, server 120 may be comprised of a cluster or plurality of computing devices, working together or working separately. Server 120 is described in more detail with reference to FIG. 4.

In the example embodiment, criteria ranking program 122 is a software application capable of receiving criteria 114 and identifying problematic language within criteria 114. In particular, criteria ranking program 122 is capable of identifying semantic entailment between two or more criteria as well as identifying individual inclusionary criteria that appears as exclusionary criteria. In addition, criteria ranking program 122 is capable of identifying individual exclusionary criteria that is difficult to interpret as well as identifying individual criteria having hypothetical, time specific, or complex language. If criteria ranking program 122 identifies semantic entailment between global criteria or individual inclusionary criteria appearing as exclusionary criteria, criteria ranking program 122 is capable of scoring and ranking the criteria. Moreover, if criteria ranking program 122 determines identifies exclusionary criteria that is difficult to interpret or contains hypothetical, time sensitive, or complex language, criteria ranking program 122 is capable of scoring and ranking the criteria. Lastly, criteria ranking program 122 is capable of assigning final rankings to the criteria and presenting the ranked criteria to a user.

Figure 2:
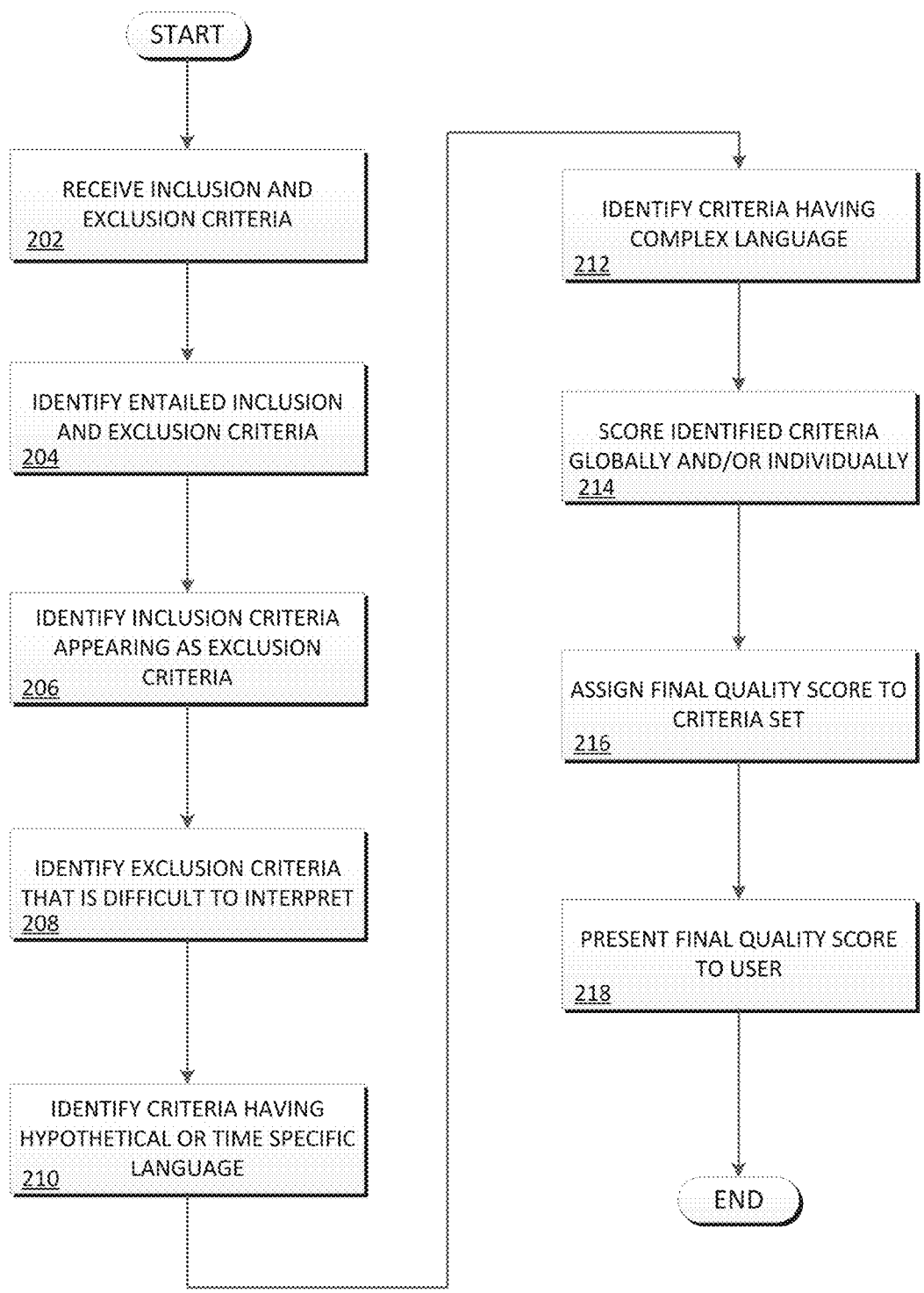
FIG. 2 is a schematic diagram of criteria ranking program 122 of criteria ranking system 100 in identifying problematic language in criteria and ranking the criteria, in accordance with an embodiment of the present invention.

FIG. 2 illustrates the operations of criteria ranking program 122 in the identification of problematic language in inclusion and exclusion criteria as well as the ranking thereof. In the example embodiment, criteria ranking program 122 analyses and ranks inclusion and exclusion criteria with regard to five problematic natural language aspects. In the first aspect, criteria is ranked globally by identifying semantic entailment between inverse criteria, i.e. an inclusion criteria set and an exclusion criteria set. In the remaining four aspects, criteria is ranked individually by identifying problematic language, such as inclusion criteria appearing as exclusion criteria, exclusion criteria being difficult to interpret, and criteria including hypothetical, time sensitive language, or complex language.

In the example embodiment, criteria ranking program 122 receives one or more criteria of criteria 114 from computing device 110 via user interface 112 and network 108 (step 202). In other embodiments, however, criteria ranking program 122 may receive or retrieve criteria 114 via other means, such as mapping of a directory/location of criteria 114 by a user, automatic retrieval of criteria 114 at a specified frequency, or automatic retrieval upon detection of updates to criteria 114. For example, criteria ranking program 122 may be configured to check for new criteria within criteria 114 once a day or, alternatively, criteria ranking program 122 may be configured to check for new criteria upon detection of updates to criteria 114. In the example embodiment, criteria 114 may be written in terms of inclusion, i.e. qualities the applicant must have, and/or exclusion, i.e. qualities the applicant must not have. Moreover, the criteria may include individual inclusion criteria and exclusion criteria, or sets of both inclusion and exclusion criteria, known as a global criteria set.

For example, criteria ranking program 122 receives the following inclusion and exclusion criteria sets illustrated by Tables 1 and 2, respectively:

TABLE 1

| Inclusion Criteria |
| --- |
| 1. Subjects of child bearing potential must have a negative urine pregnancy test within 5 days prior to first dose of the study drug. |

TABLE 1-continued

| Inclusion Criteria |
| --- |
| 2. HER2 equivocal are not eligible. |
| 3. Pregnant patients are excluded. |
| 4. Patients must have received treatment with an anthracycline (e.g. doxorubicin, epirubicin) unless contraindicated and a taxane (e.g. paclitaxel, docetaxel) in either a neo-adjuvant/adjuvant or metastatic setting. |
| 5. No major surgery within 28 days of study entry. |
| 6. No active brain metastasis within 6 months. |
| 7. Subjects must have adequate hepatic and renal function within 6 weeks prior to registration. |
| 8. Patients who are able to tolerate intensive first lien treatment as judged by an investigator. |
| 9. Patients having type A+ blood. |

TABLE 2

| Exclusion Criteria |
| --- |
| 1. No evidence of central nervous system (CNS) metastases. |
| 2. Patients must not be pregnant. |
| 3. No medical, psychological or surgical condition which the investigator feels might compromise study participation. |
| 4. Subjects must not have a history of any significant renal or hepatic disease requiring ongoing medical or clinical intervention. |
| 5. Patients, who are able to tolerate intensive first lien treatment as judged by an investigator. |
| 6. Patients not having type A+ blood. |

In the example embodiment, criteria ranking program 122 identifies semantic entailment between two or more global criteria, i.e. inclusion and exclusion criteria, within criteria 114 (step 204). Text is considered semantically entailed when the truth of one statement implies the truth of another statement, i.e. a sentence A entails sentence B (A||-B) if whenever A is true, then B must also be true. For example, the statement Mary broke the window is semantically entailed with the statement the window broke because Mary breaking the window implies that the window is broken. Similarly, criteria ranking program 122 identifies inclusion and exclusion criteria as semantically entailed if a truth of an inclusion criteria is implied by an exclusion criteria or vice versa. In the example embodiment, criteria ranking program 122 determines semantic entailment using Tree Recursive Neural Networks, or TreeRNNs. TreeRNNs are models that are used to produce strong semantic representations for sentences. TreeRNNs are utilized to determine sentence meaning in an array of complex language tasks, including sentiment analysis, image description, and paraphrase detection. In other embodiments, however, criteria ranking program 122 may apply any known technique for identifying semantic entailment between inclusion and exclusion criteria sets, for example a vector sentence representation, a constraint tree, a predictive model, or a logical tree structure to determine semantics of criteria.

Semantic entailment between inclusion and exclusion criteria is problematic for several reasons, as will be discussed with reference to several of the example criteria presented above (step 204 continued). In a most extreme scenario of semantic entailment, an inclusion criteria is identical to an exclusion criteria and, by definition, a candidate may be both included under the inclusion criteria and excluded under the exclusion criteria simultaneously. In this case, criteria is both entailing and, due to the nature of inclusion criteria listing characteristics for candidate inclusion and exclusion criteria listing characteristics for candidate exclusion, contradictory. Consider the above inclusion criteria Patients who are able to tolerate intensive first lien treatment as judged by an investigator and the exclusion criteria Patients who are able to tolerate intensive first lien treatment as judged by an investigator. In this case, admittedly extreme, a patient who is able to tolerate an intensive first lien treatment is both included and excluded from this particular trial. Here, the criteria is both entailing and contradicting, thereby nullifying this particular criteria, reducing the overall quality of the overall criteria set, and limiting a number of eligible candidates. Criteria ranking program 122 detects this entailment and marks the criteria as potentially needing clarification such that a user can remove or edit one of the contradicting criteria and, thus, improve both the quality and effectiveness of the set.

In a more common scenario, inclusion criteria and exclusion criteria are not identical nor necessarily contradicting, however they are nonetheless semantically entailed by enumerating a same truth, or requirement/characteristic (step 204 continued). In this scenario, a first problem involves having a same requirement in inverse/opposite polarities, i.e. inclusion vs. exclusion. Requiring a same characteristic among inverse polarities is likely to introduce additional negation and, ultimately, additional room for error. For example and with reference to the criteria introduced above, the inclusion criteria Patients having type A+ blood and exclusion criteria Patients not having type A+ blood recite a same truth, i.e. requiring type A+ blood, yet the exclusionary criteria introduces unnecessary negation in the exclusion criteria with the terms not having. Simply enumerating inclusion criteria requiring patients with A+ blood type or exclusion criteria excluding patients without A+ type will suffice to filter A+ blood type candidates without including additional opportunity for confusion or negation that often accompanies entangled criteria.

Another problem with semantically entailed, yet not identical nor contradicting language in global criteria sets, is alternative language between inclusion and exclusion criteria (step 204 continued). This alternative language can create different standards for each criteria, thereby creating a class of candidates who qualify under an inclusion criteria yet not an exclusion criteria (or vice versa) simply because the standard is enumerated slightly differently within the inverse criteria. Consider the above inclusion criteria Subjects of child bearing potential must have a negative urine pregnancy test within 5 days prior to first dose of the study drug and exclusion criteria Patients must not be pregnant. While both the inclusion and exclusion criteria enumerate a same truth, i.e. patient must not be pregnant, the standard differs between the criteria and a class of candidates may only qualify under either the inclusion or exclusion criteria when a consistently written set of criteria may result in candidate eligibility under both. In the criteria introduced above, for example, a patient who is determined not pregnant by any test other than a urine test is eligible under the exclusion criteria because the patient is not pregnant, yet the patient is nonetheless ineligible under the inclusion criteria because the patient did not determine non-pregnancy via a urine test. Ideally, the requirement should only be enumerated under either the inclusion or exclusion set. Alternatively, both the inclusion and exclusion criteria should enumerate a consistent standard such that a patient who is included under the inclusion criteria is not excluded under the exclusion criteria when a same requirement is enumerated by both criteria, i.e. entangled. In this case, either or both the inclusion and exclusion criteria should require a patient not be pregnant or, alternatively, a patient not be pregnant as determined by a urine test. In this way, the patient doesn't qualify under one criteria and not under an inverse criteria simply because the criteria is poorly written.

A similar semantic entailment issue is illustrated by the above inclusion criteria Subjects must have adequate hepatic and renal function within 6 weeks prior to registration and exclusion criteria Subjects must not have a history of any significant renal or hepatic disease requiring ongoing medical or clinical intervention because both criteria require a same truth, i.e. normal hepatic function, yet nonetheless recite an alternative standard, i.e. adequate function vs. lack of disease. Again, additional criteria, particularly with differing language, needlessly complicate the criteria when the requirement should be recited only once, or recited under a same standard in both the inclusion or exclusion criteria sets. Criteria ranking program 122 marks such criteria as potentially needing clarification such that an administrator can rectify this potential confusion to improve the quality of the set and increase a pool of eligible candidates.

Criteria ranking program 122 identifies individual inclusion criteria that appears as exclusion criteria (step 206). In the example embodiment, inclusion criteria may appear as exclusion criteria if it conditionally drives exclusionary behaviour through, for example, use of exclusionary language. In the example embodiment, a natural language processing (NLP) method is applied to construct logical representations of the inclusion criteria. If an inclusion criteria includes language that implies exclusion, e.g. not eligible, excluded, not permitted, not allowed, etc., then criteria ranking program 122 marks the inclusion criteria as potentially needing clarification. In the example embodiment, criteria ranking program 122 considers nuances of natural language, such as double negatives, and by default utilizes a threshold of one or more exclusionary language per inclusion criteria to be considered appearing as exclusionary.

Continuing the previously introduced example above, criteria ranking program 122 creates a logical representation of the criteria HER2 equivocal are not eligible as IF (HER equivocal) THEN (NOT eligible). Similarly, criteria ranking program 122 creates a logical representation of the criteria Pregnant patients are excluded as IF (pregnant) THEN (excluded). Based on criteria ranking program 122 determining that the inclusion criteria includes exclusionary language not and excluded exceeding the default threshold of one or more exclusionary language per criteria, criteria ranking program 122 marks the aforementioned two inclusion criteria as potentially needing clarification.

Criteria ranking program 122 identifies individual exclusion criteria that contains language that is difficult to interpret (step 208). Exclusion criteria may be difficult to interpret for many reasons, including negating language within the criteria. In the example embodiment, exclusion criteria are meant to be evaluated such that if they are met, then the subject being evaluated is not eligible. When exclusion criteria is written in a way that negates primary concepts, it often times creates a double negative that makes it difficult for a computer system to evaluate. In the example embodiment, criteria ranking program 122 employs negation detection NLP methods such as a logical tree structure to understand if the key concepts in the criteria are negated. Moreover, criteria ranking program 122 uses a keyword search to identify terms indicative of negation, such as no, none, neither, cannot, unable, and the like. If criteria ranking program 122 determines that the key concepts in the criteria are negated, the system marks such criteria as potentially needing clarification. In the example embodiment, criteria ranking program 122 considers exclusion criteria as difficult to interpret if the criteria contains a number of negations exceeding a default threshold of one or more negations per exclusion criteria.

With reference again to the example above, criteria ranking program 122 identifies the exclusion criteria No evidence of central nervous system (CNS) metastases and Patients must not be pregnant or nursing as difficult to interpret because the criteria includes the terms of negation no and must not. Rather, the exclusion criteria should have been written Evidence of central nervous system (CNS) metastases and Pregnant or nursing because negation is inherently implied in exclusionary criteria. Based on determining that the exclusion criteria contains negation that exceeds the default threshold of one or more negations per exclusion criteria, criteria ranking program 122 marks the criteria as potentially needing clarification.

Criteria ranking program 122 identifies individual criteria having hypothetical or time-specific language (step 210). In the example embodiment, criteria ranking program 122 considers criteria as hypothetic when the criteria requires human judgement to comprehend, thereby limiting the ability of criteria ranking program 122 to evaluate eligibility. In the example embodiment, criteria ranking program 122 detects hypothetical language using a parse tree, however in other embodiments criteria ranking program 122 may use an existing hypothetical detection technology to identify hypothetical language. For example, criteria ranking program 122 may detect spans of text in which enclosed concepts are mentioned in a hypothetical context in which criteria ranking program 122 accepts input text as either text/plain or application/json. For text/plain, criteria ranking program 122 analyses the posted text for hypothetical text spans. For application/json, criteria ranking program 122 identifies a list of unstructured data containers in the input which provide the input text for processing and may provide previously detected entities from prior services. Criteria ranking program 122 applies the isHypothetical attribute to any previously detected annotations (i.e. entity with a text span) to indicate if it is mentioned in a hypothetical context and any hypothetical spans detected by this technology is added to the container's data object.

Continuing the example criteria introduced above, criteria ranking program 122 identifies the criteria No medical, psychological or surgical condition which the investigator feels might compromise study participation as containing hypothetical language because it is not stated what specific medical, psychological, or surgical conditions exclude a participant from a cancer trial. Thus, the terms are left to interpretation. Moreover, the requirement is contingent on an investigator judgement and, thus, additionally hypothetical.

In addition, criteria ranking program 122 identifies criteria including time specific language (step 210 continued). Criteria with time specific language are problematic because a system will have difficulty in evaluating the criteria if it does not have access to information relating to the specified time. In the example embodiment, criteria ranking program 122 identifies time specific language by analysing criteria 114 for terms indicative of time specificity, for example minutes, hours, days, weeks, months, years, and other units associated with measuring time or duration. In order to ensure that an identified term is directed to time specificity, criteria ranking program 122 may further search contextual language surrounding the identified word using keyword searches and templates. Such contextual terms include within, by, on, between, before, after, and the like. In the example embodiment, if criteria ranking program 122 identifies one or more terms indicative of time specificity per criteria, then criteria ranking program 122 marks the criteria as potentially needing clarification.

Referring back to the example introduced above, criteria ranking program 122 identifies the criteria No major surgery within 28 days of study entry and No active brain metastasis within 6 months as containing time specific language because the criteria includes the terms days, months, and within. Because criteria ranking program 122 identifies terms indicative of time sensitivity which exceed the threshold of one per criteria, criteria ranking program 122 marks the criteria as potentially needing clarification.

Criteria ranking program 122 identifies individual criteria having complex language (step 212). In the example embodiment, heuristics and a logical reasoning system (LRS) are applied to construct a logical representation. The logical representation is then used as a metric for complexity by identifying qualifiers, logical operators, and logical chunks within a criteria. Based on an amount, structure, and syntax of qualifiers, logical operators, and logical chunks within the criteria, criteria ranking program 122 determines whether the individual criteria contains complex language. In one embodiment, for example, criteria ranking program 122 may consider a criteria as having complex language based on an amount of any one of or a combination of qualifiers, logical operators, and logical chunks exceeding a threshold amount. For example, criteria ranking program 122 may consider a criteria having five or more logical operators as containing complex language. In other embodiments, criteria ranking program 122 may consider a criteria as having complex language based on an order or syntax of the qualifiers, logical operators, and logical chunks, for example identifying a threshold amount of qualifiers or logical operators in succession. In further embodiments, criteria ranking program 122 may employ an alternative method of determining criteria having complex language, for example a combination of the above two embodiments.

Continuing the example above, criteria ranking program 122 utilizes an LRS to generate a logical representation of the criteria Patients must have received treatment with an anthracycline (e.g. doxorubicin, epirubicin) unless contraindicated and a taxane (e.g. paclitaxel, docetaxel) in either a neo-adjuvant/adjuvant or metastatic setting as (IF NOT 'contraindicated' THEN 'anthracycline' OR 'doxorubicin' OR 'epirubicin') AND ('taxane' OR 'paclitaxel' OR 'docetaxel') AND ('neo-adjuvant' OR 'adjuvant' OR 'metastatic'). In the representation above, criteria ranking program 122 determines that the criteria has ten logical operators joined by eight logical operators, one condition, and three logical chunks. Moreover, the criteria specifies two conditions: with an anthracycline and a taxane. The criteria also has a qualifier, however the qualifier doesn't add any value since neoadjuvant/adjuvant or metastatic setting does not include or exclude either of those settings. Based on criteria ranking program 122 determining that the criteria contains ten logical operators, thereby exceeding the default threshold of five, criteria ranking program 122 identifies the criteria as complex and marks the criteria as potentially needing clarification.

Figure 3:
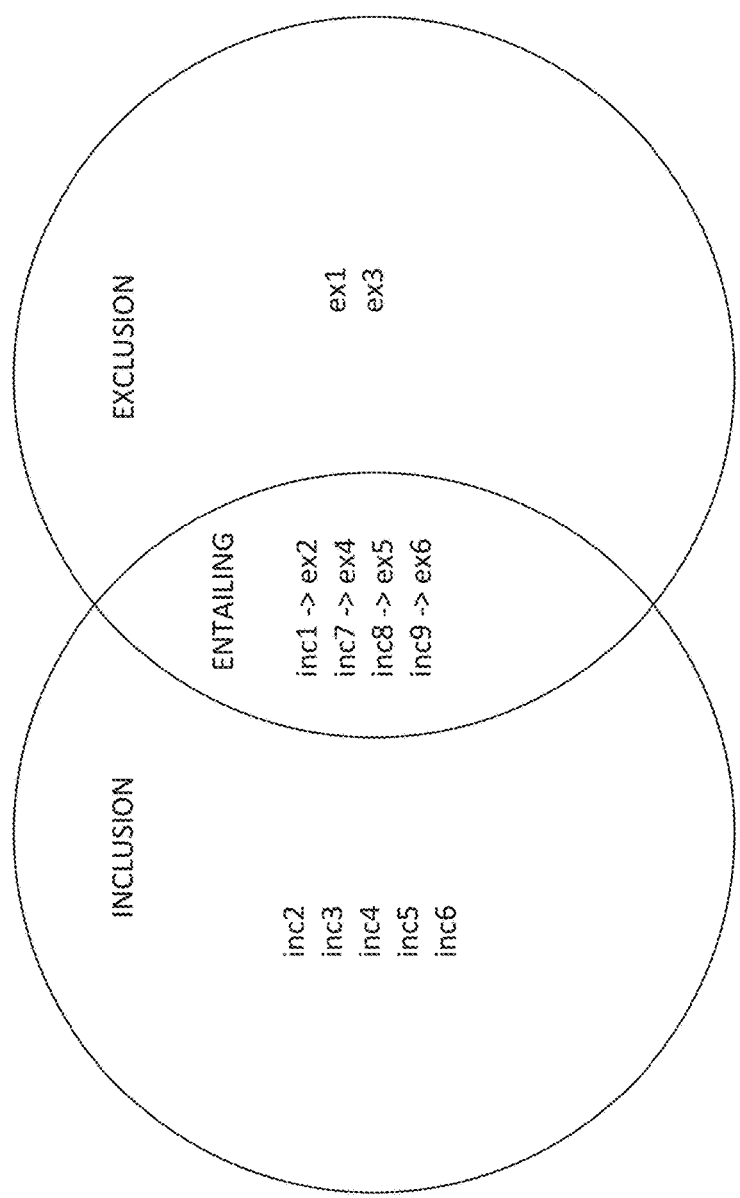
FIG. 3 illustrates a visualization of semantic entailment between inclusion and exclusion criteria, in accordance with an embodiment of the present invention.

Criteria ranking program 122 scores the criteria potentially needing clarification both globally and individually, when applicable (step 216). In the example embodiment, criteria ranking program 122 scores global and individual criteria using a penalty system wherein criteria having the highest amount of penalties are identified as most in need of clarification. With regard to semantic entailment, entailment between a global criteria sets is presented as a percentage of overlap or as a visual representation, as illustrated by FIG. 3, and a score is determined by a total number of entailed criteria's meetings between the inclusion set and the exclusion set in an intersection graph. In the example embodiment, a penalty is assessed for each edge of an inclusion criteria that meets an edge of an exclusion criteria, for example a penalty of one per meeting. In alternative embodiments, other semantic entailment ranking techniques may be applied, such as predictive model generation and cohort identification. When using predictive model generation, for example, criteria ranking program 122 searches a dataset in order to derive metrics from inclusion set criteria, exclusion set criteria, and a set of unique content elements. In another example utilizing cohort identification, criteria ranking program 122 transforms the cohort criteria into a constraint tree in order to apply the cohort criteria to a plurality of participant records.

With reference again to the example above, FIG. 3 illustrates a Venn diagram wherein multiple edges of inclusion criteria meet multiple edges of the exclusion criteria, thereby representing entailment. Based on the eight edges meeting, criteria ranking program 122 assigns a penalty of four, as well as a score of four, to the global set. Note that a score is an aggregate amount of penalties assessed to a criteria. Thus, when only a single penalty is applied to a criteria, a score and penalty may be used synonymously.

In addition to scoring global criteria based on entailment, criteria ranking program 122 also scores individual criteria based on the type of the problematic natural language aspect (step 214 continued). In the example embodiment, inclusionary criteria appearing as exclusionary criteria (determined in step 206) and exclusionary criteria being difficult to interpret (determined in step 208) carry the highest penalties, for example a penalty of three, while criteria having complex language (determined in step 212) carry a lesser penalty of two. In addition, criteria having hypothetical and time sensitivity language (determined in step 210) are less penalized, for example a penalty of one. In other embodiments, weighted penalties may be assessed alternatively.

Continuing the previously introduced example, criteria ranking program 122 assesses a score of three to the criteria HER2 equivocal are not eligible, Pregnant patients are excluded, No evidence of central nervous system (CNS) metastases, and Patients must not be pregnant or nursing because the criteria is either an inclusion criteria that appears to be an exclusion criteria or the exclusion criteria is difficult to interpret. In addition, criteria ranking program 122 assesses a score of two to the criteria No medical, psychological or surgical condition which the investigator feels might compromise study participation, No major surgery within 28 days of study entry, and No active brain metastasis within 6 months because the criteria contains hypothetical or time specific language. Lastly, criteria ranking program 122 assesses a score of one to the criteria Patients must have received treatment with an anthracycline (e.g. doxorubicin, epirubicin) unless contraindicated and a taxane (e.g. paclitaxel, docetaxel) in either a neo-adjuvant/adjuvant or metastatic setting because the criteria is determined to contain complex language.

Criteria ranking program 122 assigns a final quality score to the criteria set (step 216). In the example embodiment, criteria ranking program 122 assigns a final quality score to global sets of criteria and individual criteria based on the aggregate, or cumulative, amount of applied penalties. In the example embodiment, criteria may be penalized both globally as well as individually and criteria having the highest cumulative total of penalties are ranked as having the lowest quality. For example, criteria that is entailing may also be complex and thus may be penalized for both of the aforementioned problematic natural language aspects.

Continuing the example regarding the criteria introduced above, criteria ranking program 122 assesses a final score of three to the criteria the criteria HER2 equivocal are not eligible, Pregnant patients are excluded, No evidence of central nervous system (CNS) metastases, and Patients must not be pregnant or nursing. In addition, criteria ranking program 122 assesses a final score of two to the criteria No medical, psychological or surgical condition which the investigator feels might compromise study participation, No major surgery within 28 days of study entry, and No active brain metastasis within 6 months. Lastly, criteria ranking program 122 assesses a final score of one to the criteria Patients must have received treatment with an anthracycline (e.g. doxorubicin, epirubicin) unless contraindicated and a taxane (e.g. paclitaxel, docetaxel) in either a neo-adjuvant/adjuvant or metastatic setting.

Criteria ranking program 122 presents the final quality score of the criteria (step 218). In the example embodiment, the final quality score is the aggregate of the penalties assessed in the previous assessments. In the example embodiment, criteria ranking program 122 transmits the final quality score of the criteria set to computing device 110 via network 108 with the criteria having the highest score more prominently presented, for example at the top of the list of ranked criteria. In other embodiments, the final quality scores may be presented alternatively. In some embodiments, criteria ranking program 122 may only present criteria exceeding a threshold amount, for example two or more penalties, while in other embodiments criteria ranking program 122 may present all criteria. In the example embodiment, a user is able to select individual criteria from the presentation screen for modification, deletion, and the like.

Continuing the example previously introduced, criteria ranking program 122 presents the criteria to a user in descending order starting with the criteria having a highest penalty, in this case three, and descending to the criteria having the lowest penalty, in this case one.

FIG. 3 is a visual representation of global entailment between the example criteria introduced above. In the example embodiment, the entailment between the inclusion and exclusion criteria are represented in a Venn diagram, however in other embodiments may be illustrated otherwise. Entailment between the inclusion and exclusion criteria are indicated by the overlap of criteria within the central area labelled Entailing. As illustrated by FIG. 3, inclusion criteria 1, 7, 8, 9 and exclusion criteria 2, 4, 5, 6 fall into the Entailing region because the criteria is semantically entailed. The rest of the criteria fall within their respective regions representing inclusion and exclusion sets since there is no entailment between them.

While the present invention has been described and illustrated with reference to particular embodiments, it will be appreciated by those of ordinary skill in the art that the invention lends itself to many different variations not specifically illustrated herein.

The present invention may be a system, a method, and/or a computer program product. The computer program product may include a computer readable storage medium (or media) having computer readable program instructions thereon for causing a processor to carry out aspects of the present invention.

Figure 4:
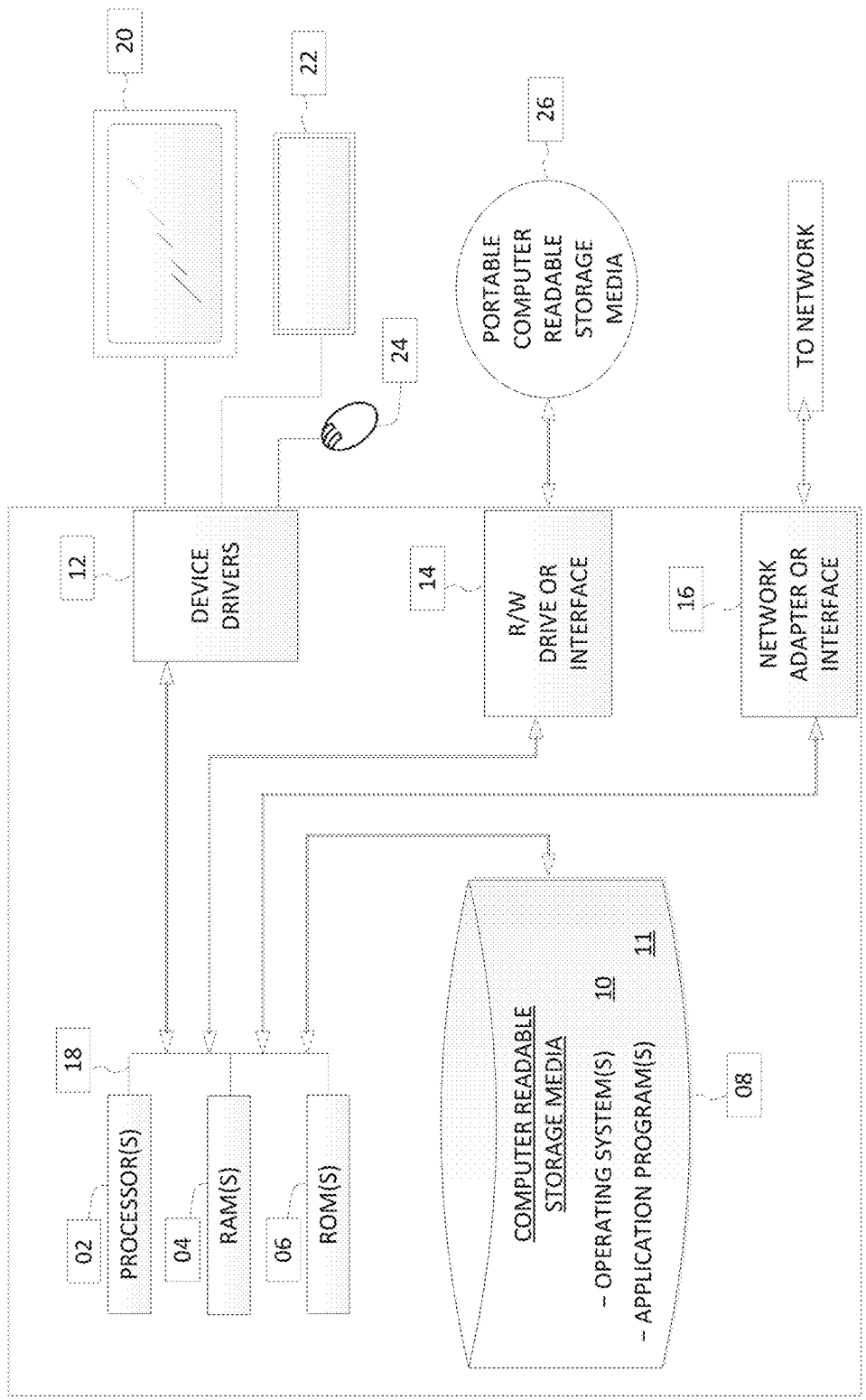
FIG. 4 is a block diagram depicting the hardware components of criteria ranking program system 100 of FIG. 1, in accordance with an embodiment of the invention.

FIG. 4 depicts a block diagram of computing device 110 and server 120 of the criteria ranking system 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11, for example criteria ranking program 122, are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Computing device 110 may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Computing device 110 may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
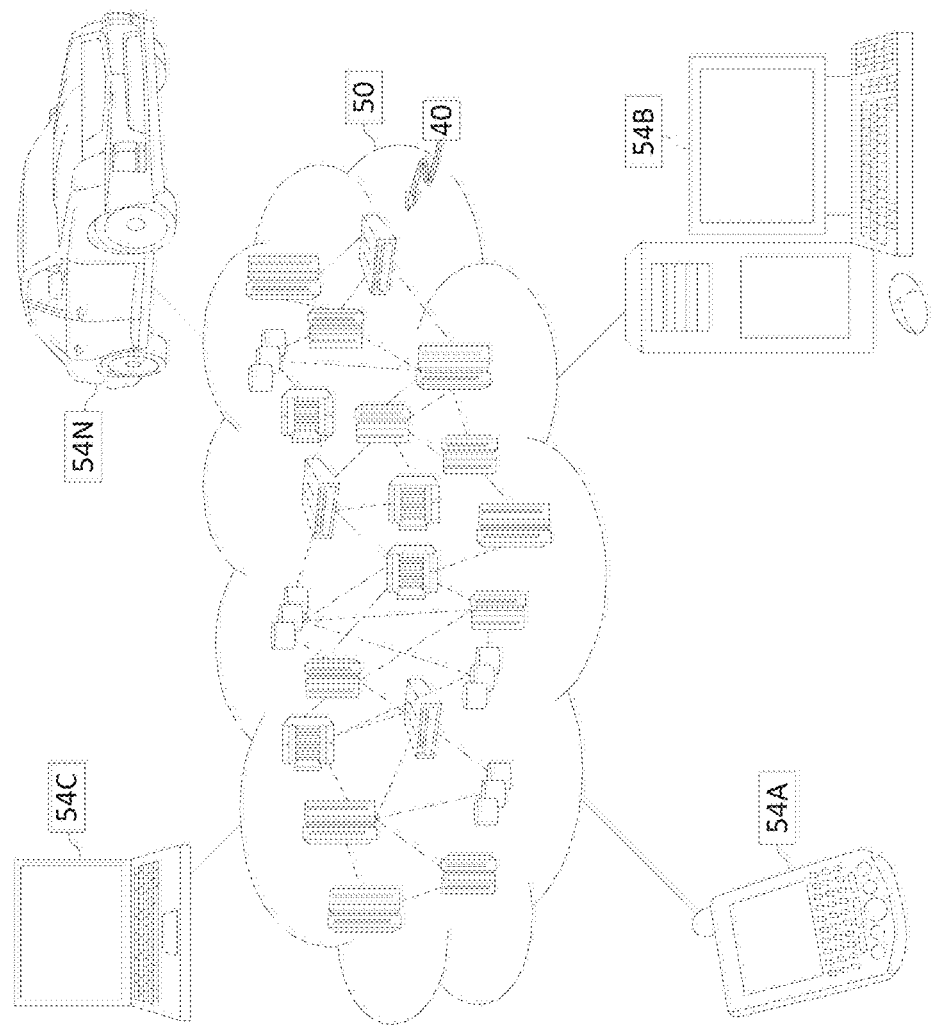
FIG. 5 depicts a cloud computing environment, in accordance with an embodiment of the present invention.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
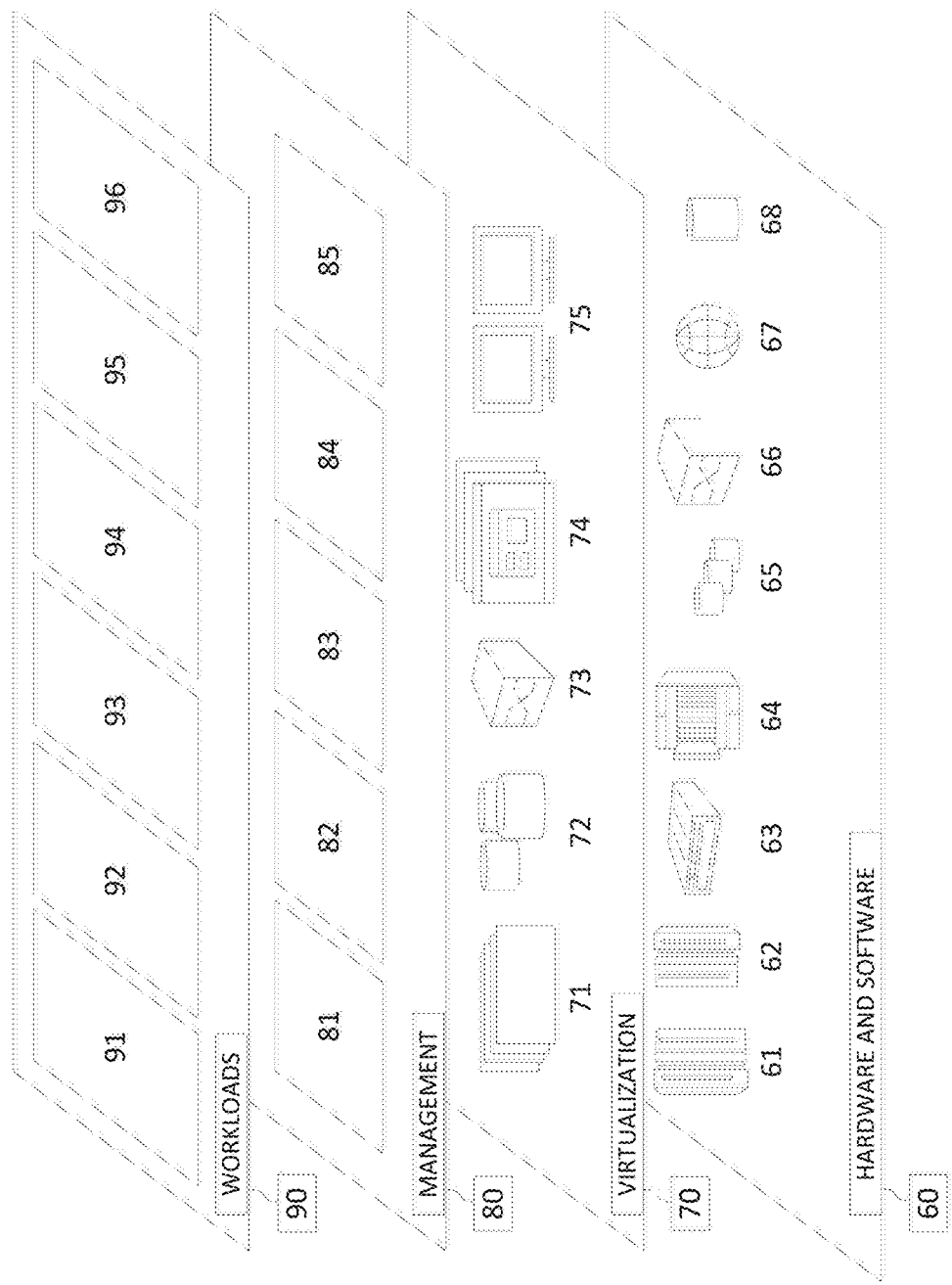
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and criteria processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for ranking natural language inclusion and exclusion criteria, the method comprising:
    a computer receiving one or more natural language criteria;
    the computer determining whether at least one inclusion criteria of the one or more natural language criteria and at least one exclusion criteria of the one or more natural language criteria are semantically entailed;
    based on determining that the at least one inclusion criteria and the at least one exclusion criteria are semantically entailed, the computer assigning a first score to and marking the at least one inclusion criteria and the at least one exclusion criteria as needing clarification;
    the computer ranking the one or more natural language criteria marked as needing clarification based on the assigned score; and
    the computer providing an option to modify or delete the ranked one or more natural language criteria needing clarification.

2. The method of claim 1, further comprising:
    the computer constructing a logical representation of the one or more natural language criteria;
    the computer determining whether at least one first criteria of the one or more natural language criteria is complex based on the logical representation; and based on determining that the at least one first criteria is complex, the computer assigning a second score to and marking the at least one first criteria as needing clarification.

3. The method of claim 2, further comprising:

the computer determining whether at least one second criteria of the one or more natural language criteria contains at least one of hypothetical language and time-specific language; and based on determining that the at least one second criteria contains at least one of hypothetical language and time-specific language, the computer assigning a third score to and marking the at least one second criteria as needing clarification.

4. The method of claim 3, further comprising:

the computer determining whether at least one inclusion criteria includes exclusionary language; and based on determining that the at least one inclusion criteria includes exclusionary language, the computer assigning a fourth score to and marking the at least one inclusion criteria that includes exclusionary language as needing clarification.

5. The method of claim 4, wherein the first score and the second score are less than that of the third score, and wherein the third score is less than that of the fourth score; and further comprising the computer aggregating the first score, the second score, the third score, and the fourth scores with respect to each of the one or more natural language criteria.

6. The method of claim 5, further comprising:

the computer presenting the ranked one or more natural language criteria.

7. A computer program product for ranking natural language inclusion and exclusion criteria, the computer program product comprising:

one or more computer-readable storage media and program instructions stored on the one or more computer-readable storage media capable of performing a method, the method comprising:

a computer receiving one or more natural language criteria;

the computer determining whether at least one inclusion criteria of the one or more natural language criteria and at least one exclusion criteria of the one or more natural language criteria are semantically entailed;

based on determining that the at least one inclusion criteria and the at least one exclusion criteria are semantically entailed, the computer assigning a first score to and marking the at least one inclusion criteria and the at least one exclusion criteria as needing clarification;

the computer ranking the one or more natural language criteria marked as needing clarification based on the assigned score; and the computer providing an option to modify or delete the ranked one or more natural language criteria needing clarification.

8. The computer program product of claim 7, further comprising:

the computer constructing a logical representation of the one or more natural language criteria;

the computer determining whether at least one first criteria of the one or more natural language criteria is complex based on the logical representation; and based on determining that the at least one first criteria is complex, the computer assigning a second score to and marking the at least one first criteria as needing clarification.

9. The computer program product of claim 8, further comprising:

the computer determining whether at least one second criteria of the one or more natural language criteria contains at least one of hypothetical language and time-specific language; and based on determining that the at least one second criteria contains at least one of hypothetical language and time-specific language, the computer assigning a third score to and marking the at least one second criteria as needing clarification.

10. The computer program product of claim 9, further comprising:

the computer determining whether at least one inclusion criteria includes exclusionary language; and based on determining that the at least one inclusion criteria includes exclusionary language, the computer assigning a fourth score to and marking the at least one inclusion criteria that includes exclusionary language as needing clarification.

11. The computer program product of claim 10, wherein the first score and the second score are less than that of the third score, and wherein the third score is less than that of the fourth score; and further comprising the computer aggregating the first score, the second score, the third score, and the fourth scores with respect to each of the one or more natural language criteria.

12. The computer program product of claim 11, further comprising:

the computer presenting the ranked one or more natural language criteria.

13. A computer system for ranking natural language inclusion and exclusion criteria, the computer system comprising:

one or more computer processors, one or more computer-readable storage media, and program instructions stored on one or more of the computer-readable storage media for execution by at least one of the one or more processors capable of performing a method, the method comprising:

a computer receiving one or more natural language criteria;

the computer determining whether at least one inclusion criteria of the one or more natural language criteria and at least one exclusion criteria of the one or more natural language criteria are semantically entailed;

based on determining that the at least one inclusion criteria and the at least one exclusion criteria are semantically entailed, the computer assigning a first score to and marking the at least one inclusion criteria and the at least one exclusion criteria as needing clarification;

the computer ranking the one or more natural language criteria marked as needing clarification based on the assigned score; and the computer providing an option to modify or delete the ranked one or more natural language criteria needing clarification.

14. The computer system of claim 13, further comprising:

the computer constructing a logical representation of the one or more natural language criteria;

the computer determining whether at least one first criteria of the one or more natural language criteria is complex based on the logical representation; and based on determining that the at least one first criteria is complex, the computer assigning a second score to and marking the at least one first criteria as needing clarification.

15. The computer system of claim 14, further comprising:

the computer determining whether at least one second criteria of the one or more natural language criteria contains at least one of hypothetical language and time-specific language; and based on determining that the at least one second criteria contains at least one of hypothetical language and time-specific language, the computer assigning a third score to and marking the at least one second criteria as needing clarification.

16. The computer system of claim 15, further comprising:
the computer determining whether at least one inclusion criteria includes exclusionary language; and based on determining that the at least one inclusion criteria includes exclusionary language, the computer assigning a fourth score to and marking the at least one inclusion criteria that includes exclusionary language as needing clarification.

17. The computer system of claim 16, wherein the first score and the second score are less than that of the third score, and wherein the third score is less than that of the fourth score; and further comprising the computer aggregating the first score, the second score, the third score, and the fourth scores with respect to each of the one or more natural language criteria.

18. The computer system of claim 17, further comprising:
the computer presenting the ranked one or more natural language criteria.

\* \* \* \* \*